United States Patent [19]

Onoda

[11] 4,265,127
[45] May 5, 1981

[54] LOW METER SYSTEM PROVIDED WITH A PULSE GENERATOR

[75] Inventor: Hajime Onoda, Tokyo, Japan

[73] Assignee: Kimmon Manufacturing Co., Ltd., Tokyo, Japan

[21] Appl. No.: 44,519

[22] Filed: Jun. 1, 1979

[30] Foreign Application Priority Data

Jun. 2, 1978 [JP] Japan ............................ 53/75646[U]

[51] Int. Cl.³ ............................................. G01F 1/58
[52] U.S. Cl. ............................. 73/861.78; 73/861.79
[58] Field of Search ..................... 73/229, 230, 231 R, 73/231 M, 185, 187, 189, 194 EM, 861.78, 861.77

[56] References Cited

U.S. PATENT DOCUMENTS

| 3,370,465 | 2/1968 | Belle | 73/230 |
| 3,589,188 | 6/1971 | Belle | 73/230 |
| 3,610,039 | 10/1971 | Althouse | 73/231 R |

FOREIGN PATENT DOCUMENTS

| 2508927 | 9/1976 | Fed. Rep. of Germany | 73/231 R |
| 758755 | 10/1956 | United Kingdom | 73/187 |

OTHER PUBLICATIONS

Philip E. Wigen, "Wiegand Wire: New Material for Magnetic-Based Devices", Electronics, Jul. 10, 1975, pp. 100-105.

Primary Examiner—Donald O. Woodiel
Attorney, Agent, or Firm—Frishauf, Holtz, Goodman & Woodward

[57] ABSTRACT

A flow meter comprises a fan wheel provided in a passage of a running fluid to be rotated thereby; a composite magnetic wire formed of a core and shell and fitted to the fan wheel; a pair of mutually facing permanent magnets arranged substantially in parallel above a plane through which the composite magnetic wire is rotated, with the poles of the opposite polarities set adjacent to each other; a magnetic core wound with a coil and disposed between the paired permanent magnets, and wherein, when the composite wire faces one of the paired permanent magnets, the alignment direction of the respective magnetic domains of the core of the composite magnetic wire is changed, and when the composite wire faces the other of the paired permanent magnets, the respective magnetic domains of the core of the composite magnetic wire regains the alignment direction before said change. Therefore, when the composite magnetic wire passes below the paired permanent magnets, pulses are generated in the coil; pulses thus generated are counted by a counter; a counted number of pulses is converted into a signal denoting a detected flow of a running fluid; and the converted signal is registered and indicated on a display device.

9 Claims, 4 Drawing Figures

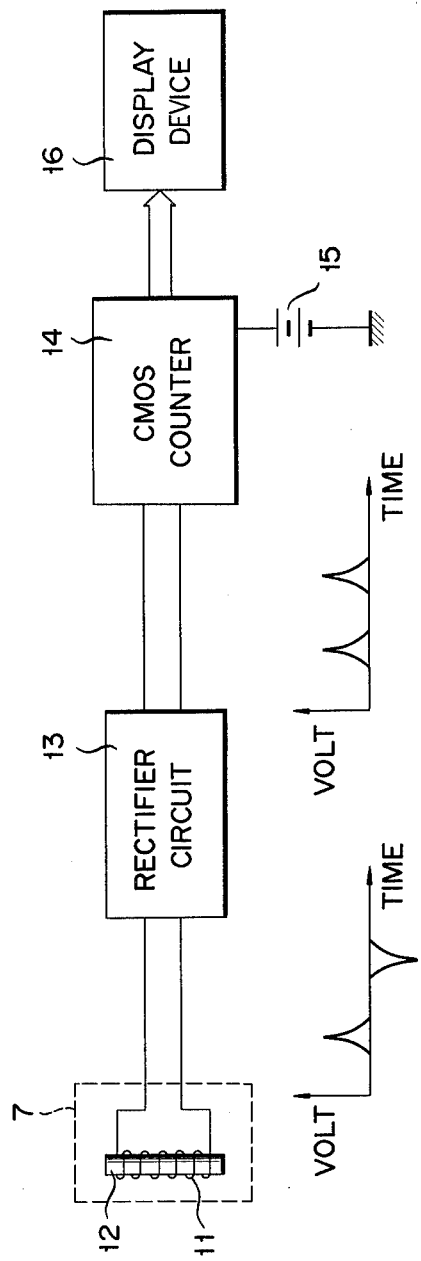
F I G. 4

LOW METER SYSTEM PROVIDED WITH A PULSE GENERATOR

BACKGROUND OF THE INVENTION

This invention relates to a flow meter system provided with a pulse generator producing electrical pulses corresponding to a flow rate of a fluid.

A known flow meter system for detecting a flow of a fluid, for example, running water, oil or gas is the type in which a movable body such as a fan wheel or turbine is driven by the fluid; and the rotation of the fan wheel is transmitted to a mechanical type motor by means of a mechanical trains to turn an indicator of said mechanical type meter, thereby registering the flow of the fluid.

With the prior art flow meter system, however, the gear trains are a considerably heavy load on the fan wheel. Where a fluid runs at a low flow rate, such a heavy load cannot be overlooked. At a low flow rate of a fluid, therefore, the rotating moment of a movable part of the conventional flow meter such as a blade wheel fails to exactly indicate a flow measured from time to time, tending to give rise to metering errors. Consequently, it has been demanded to develop a flow meter system which always produces an output accurately corresponding to a flow of a fluid, whether it is high or low.

It is accordingly the object of this invention to provide a flow meter system able to work with a small power consumption and which issues pulses in exact conformity to a flow of a fluid, thereby accurately registering and displaying the flow.

SUMMARY OF THE INVENTION

According to the invention, a flow meter comprises:
a composite wire which is formed of a core and shell having different coercive forces and mounted on a movable member, so as to move in a movement path and in which the alignment direction of the respective magnetic domains of either of the core and shell of the composite wire is reversed when an external magnetic field is applied to said composite wire at a threshold level;
a pulse generator including a pair of permanent magnets arranged to face the movement path of the composite magnetic wire, a magnetic core positioned adjacent to one of the paired permanent magnets and a coil wound around the core;
counter means for counting pulses generated from the pulse generator; and
display means for indicating a flow of a running fluid as a function of the number of pulses counted by the counter means.

BRIEF DESCRIPTION OF THE DRAWINGS

FIG. 4 is a block circuit diagram of a flow meter system embodying this invention.

DETAILED DESCRIPTION

Figure 1:
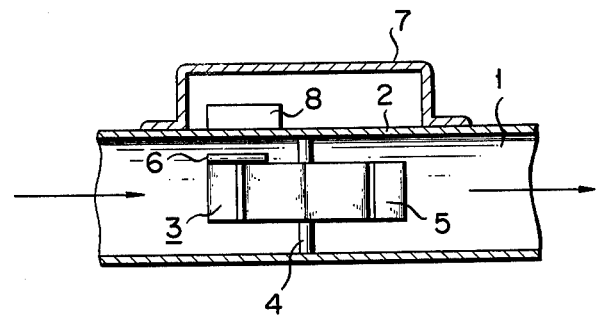
FIG. 1 is a schematic sectional view of a flow detecting unit of a flow meter system embodying this invention.
Figure 2:
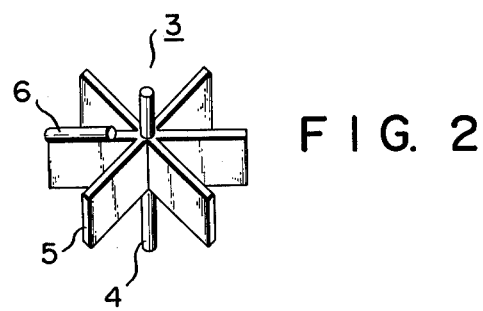
FIG. 2 is a schematic oblique view of a fan wheel shown in FIG. 1.

Referring to FIG. 1, a fluid pipe 2 constituting a fluid passage 1 is provided with a rotary shaft 4 rotatably pivoted in the fluid passage 1 and a fan wheel 3 having six blades 5 secured around the rotary shaft 4. The fan wheel 3 operates with a deflected fluid, that is, a fluid striking against one of the surfaces of the respective blades of the fan wheel 3 substantially at right angles. A composite magnetic wire 6 is fitted to or embedded in one of the six blades 5 of the fan wheel 3. This composite wire 6 is generally referred to as a "Wiegand wire", and is formed of a core and shell having different coercive forces. The Wiegand wire has the characteristic that where a magnetic field having a prescribed magnitude, that is, a threshold magnetic field is applied to the Wiegand wire, the alignment direction of the respective magnetic domains of the core of said Wiegand wire is reversed due to the low coercive force of the core, but the alignment direction of the respective magnetic domains of the shell of the Wiegand wire remains unchanged, thereby changing the magnitude of an external magnetic field generated by the Wiegand wire. The above-mentioned Wiegand wire is reported by P.E. Wiegand in "Electronics", page 100, July, 1975.

Figure 3:
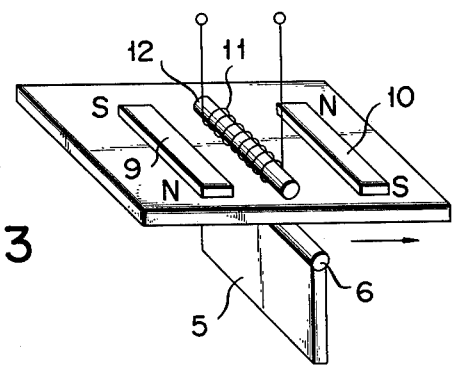
FIG. 3 is a schematic oblique view of a pulse generating unit shown in FIG. 1.

A flow rate detector or pulse generator 8 is received in a cover 7 in a state mounted on the surface of the fluid pipe 2 which is located above a plane through which the composite magnetic wire 6 passes while being rotated by the fan wheel 3. The flow rate detector 8 comprises, as shown in FIG. 3, first and second permanent magnets 9, 10 and a magnetic core 12 wound with a coil 11. The first permanent magnet 9, magnetic core 12 wound with the coil 11 and second permanent magnet 10 are arranged at a relatively close spacing in the order mentioned taken in the direction in which the composite wire 6 is rotated. The paired permanent magnets 9, 10 are arranged in a mutually facing relationship, with the poles of the opposite polarities set adjacent to each other.

The coil 11 wound about the magnetic core 12 is connected to a rectifier circuit 13 (FIG. 4), which is connected to a counter 14, which is an n-digit type complementary metal oxide semiconductor (abbreviated as "CMOS") decimal counter. CMOS counter 14 is actuated by power supplied from, for example, a lithium cell 15. The output terminal of the CMOS counter 14 is connected to a display device 16. It is possible to connect the output terminal of the CMOS counter 14 to a central display unit (not shown) which is supplied with output signals from other counters to indicate many masses of flows at once.

Where, with a flow meter system arranged as described above according to this invention, a fluid, for example, water runs through the fluid pipe 2, then the fan wheel 3 is rotated by the fluid and consequently the composite wire (Wiegand wire) 6 turns. While being rotated, the composite wire 6 first faces the first permanent magnet 9, then the magnetic core 12 wound with the coil 11 and last the second permanent magnet 10.

When the composite wire 6 faces the first permanent magnet 9, then the respective magnetic domains of the core of said composite wire 6 are aligned in the same direction as those of the shell thereof. When the composite wire 6 faces the second permanent magnet 10, the respective magnetic domains of the core are aligned in the opposite direction to those of the shell. Thus, each time, the composite wire 6 makes one rotation, the alignment direction of the magnetic domains of the core of the composite wire 6 is turned, just before the composite wire 6 faces the coil 11. At this time, an electromotive force is produced in the coil 11 due to the changing of the direction in which an external magnetic field is applied. As a result, the flow rate detector or pulse generator 9 sends forth pulses. These pulses are generated in a number proportional to a number of rotations of the composite magnetic wire 6. Therefore, the rotation speed of the composite magnetic wire 6 corresponds to a number of pulses generated per unit time. In other words, a counted number of pulses represents a currently detected flow of a running fluid. Produced pulses are conducted, as shown in FIG. 4, through the rectifier circuit 13 to the CMOS counter 14 to be counted thereby. A count made by the CMOS counter 14 is supplied to the display device 16 formed of, for example, a liquid crystal to register and indicate a detected flow of a running fluid in the form of digits.

The foregoing description refers to the case where a pulse-generating coil 11 was positioned between a pair of closely arranged permanent magnets 9, 10. However, said paired permanent magnets 9, 10 need not be set close to each other. The reason for this is that where the paired permanent magnets 9, 10 are spatially arranged above or below the movement plane of the composite wire 6, the coil 11 never fails to detect changes in the magnitude of a magnetic field produced around one of the paired permanent magnets 9, 10, provided the coil 11 lies close thereto, and generate a pulse. There has also been described the case where the composite wire 6 was rotated by the fan wheel 3. However, it is possible to fix the composite wire 6 to a linearly reciprocating member to go back and forth on a plane. In this case, too, it well serves the purpose if a pulse generator 8 is set closely above or below a plane on which the composite wire 6 reciprocates.

The flow meter system of this invention arranged as described above is a pulse generator type flow detector, essentially making it unnecessary to supply power. The elements requiring power are only the CMOS counter 14 and display device 16, ensuring prominent saving of power. The composite magnetic wire 6 rapidly reverses the working direction of a magnetic field, regardless of the speed at which said composite magnetic wire 6 is rotated. Therefore, the pulse generator type flow detector of this invention generates pulses accurately corresponding to a high or low flow rate of a running fluid. The present flow meter system omits a gear train which has been used with the prior art flow meter. Therefore, the fan wheel 3 included in the present flow meter system undergoes only a small load, and can be rotated exactly corresponding to a flow of a running fluid, even when it flows at a low rate. In this respect, the flow meter system of this invention is guaranteed to correctly detect a flow of a running fluid. According to this invention, the fan wheel 3 is only fitted with the composite magnetic wire 6. Since the composite magnetic wire 6 has a substantially negligible size and weight, the fan wheel 3 can be smoothly rotated even when a fluid flows at a low rate.

Counted numbers of pulses produced by the pulse generator type flow meter system of this invention can be used in the remote or automatic measurement of a flow of a running fluid or can be applied as signals for the centralized detection of many masses of flows.

The foregoing embodiment relates to the case where a composite magnetic wire was rotatably mounted on a fan wheel. However, it is possible conversely to rotate the paired permanent magnets, fix the composite magnetic wire and dispose the flow detection coil adjacent to the composite magnetic wire.

The flow meter system of this invention is applicable not only to water but also to any other fluid such as oil or gas. In this case, it is advised to design the form of the fan wheel or any other rotating member in acordance with the kind of a fluid whose flow is to be detected.

What is claimed is:

1. A flow meter comprising:
    a movable member mounted in the flow of a running fluid so as to be moved as a function of said flow;
    a composite wire which is formed of a core and shell having different coercive forces and mounted on the movable member, so as to move in a movement path the alignment direction of the respective magnetic domains of either of the core and shell of said composite wire being reversed when an external magnetic field is applied to said composite wire at a threshold level;
    a pulse generator including a pair of permanent magnets arranged to face the movement path of the composite magnetic wire, a magnetic core positioned adjacent to one of the paired permanent magnets and a coil wound around the core;
    counter means coupled to said pulse generator for counting pulses generated from said pulse generator; and
    display means coupled to said counter means for indicating a flow of said running fluid as a function of the number of pulses counted by said counter means.

2. The flow meter according to claim 1, wherein said movable member is a rotor provided in a passage through which the running fluid flows, so as to be rotated thereby.

3. The flow meter system according to claim 2, wherein the rotor is a fan wheel, to which said composite magnetic wire is mounted for movement in a rotary movement path.

4. The flow meter system according to claim 2, wherein the rotor is a fan wheel, in which said composite magnetic wire is embedded.

5. The flow meter according to claim 4, wherein said fan wheel has plurality of blades thereon, said composite magnetic wire being mounted to at least one of said blades.

6. The flow meter system according to claim 1, wherein said counter is a CMOS counter.

7. The flow meter system according to claim 1, wherein said display means indicates the flow of said running fluid proportional to the number of pulses counted by said counter means.

8. The flow meter according to claim 1, wherein said paired permanent magnets of said pulse generator face each other, said magnets having their poles of opposite polarities set adjacent to each other.

9. The flow meter according to claim 1, wherein said pulse generator further comprises a rectifier circuit coupled between said coil and said counter means.

* * * * *

UNITED STATES PATENT AND TRADEMARK OFFICE
CERTIFICATE OF CORRECTION

PATENT NO. : 4,265,127

DATED : May 5, 1981

INVENTOR(S) : Hajime Onoda

It is certified that error appears in the above—identified patent and that said Letters Patent is hereby corrected as shown below:

On the initial page of the patent, change the first word of the title from "LOW" to --FLOW--.

*Signed and Sealed this*

*Eighteenth* Day of *August 1981*

[SEAL]

*Attest:*

GERALD J. MOSSINGHOFF

*Attesting Officer*     *Commissioner of Patents and Trademarks*